Feb. 23, 1954     S. N. DUNTON     2,670,099
SAFETY BOLT CONSTRUCTION
Filed March 30, 1950     4 Sheets-Sheet 1
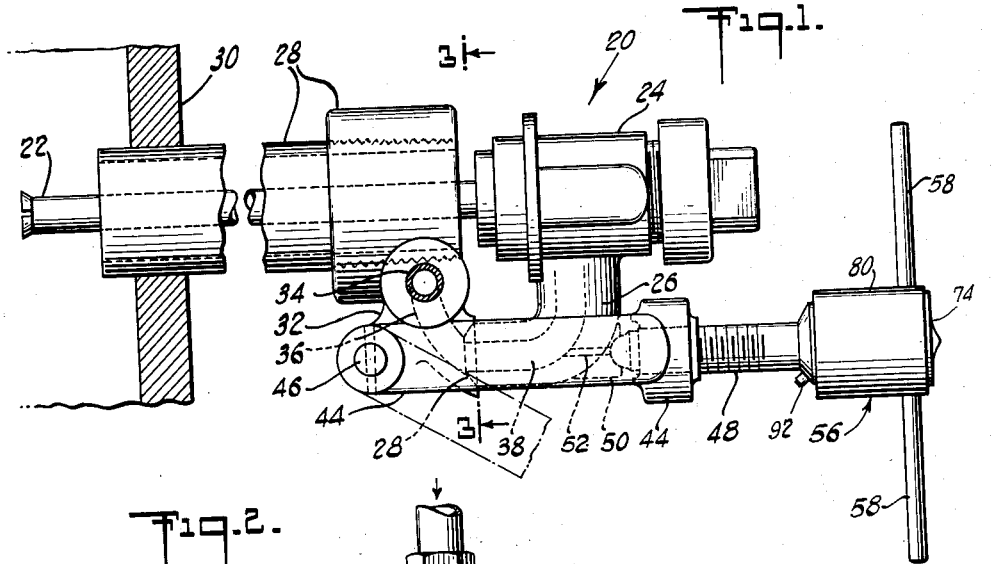
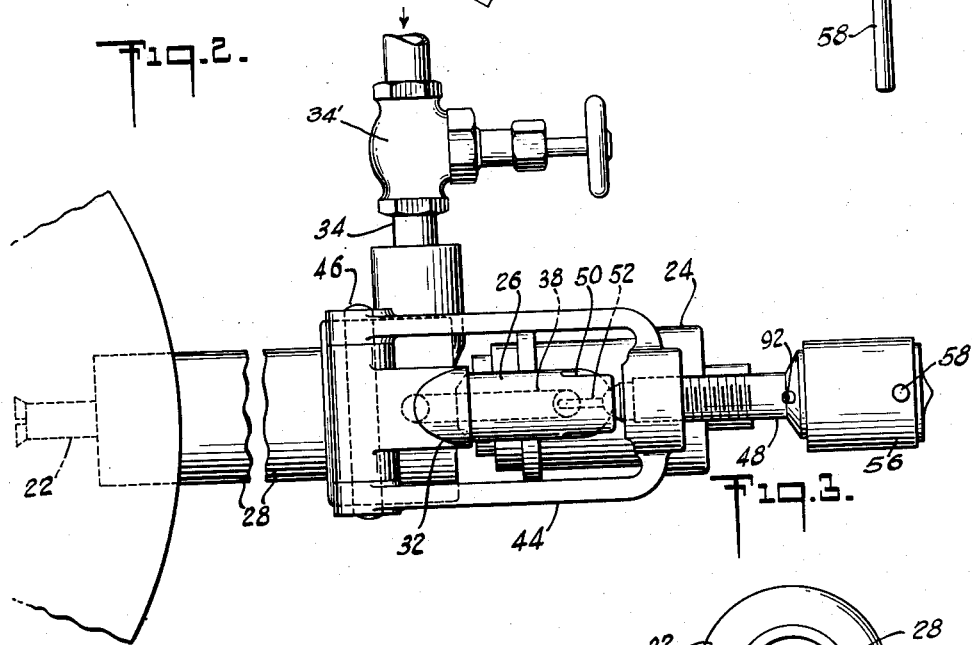
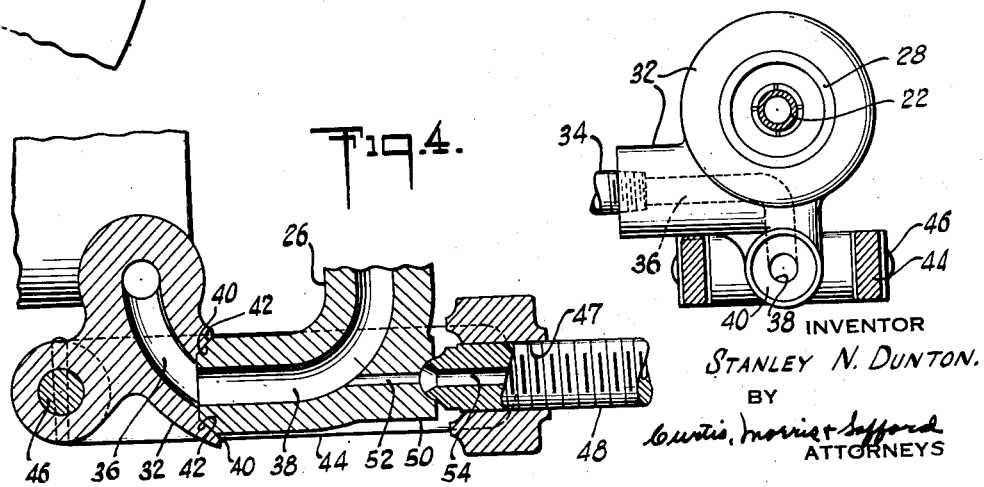
INVENTOR
STANLEY N. DUNTON.
BY
Curtis, Morris & Safford
ATTORNEYS

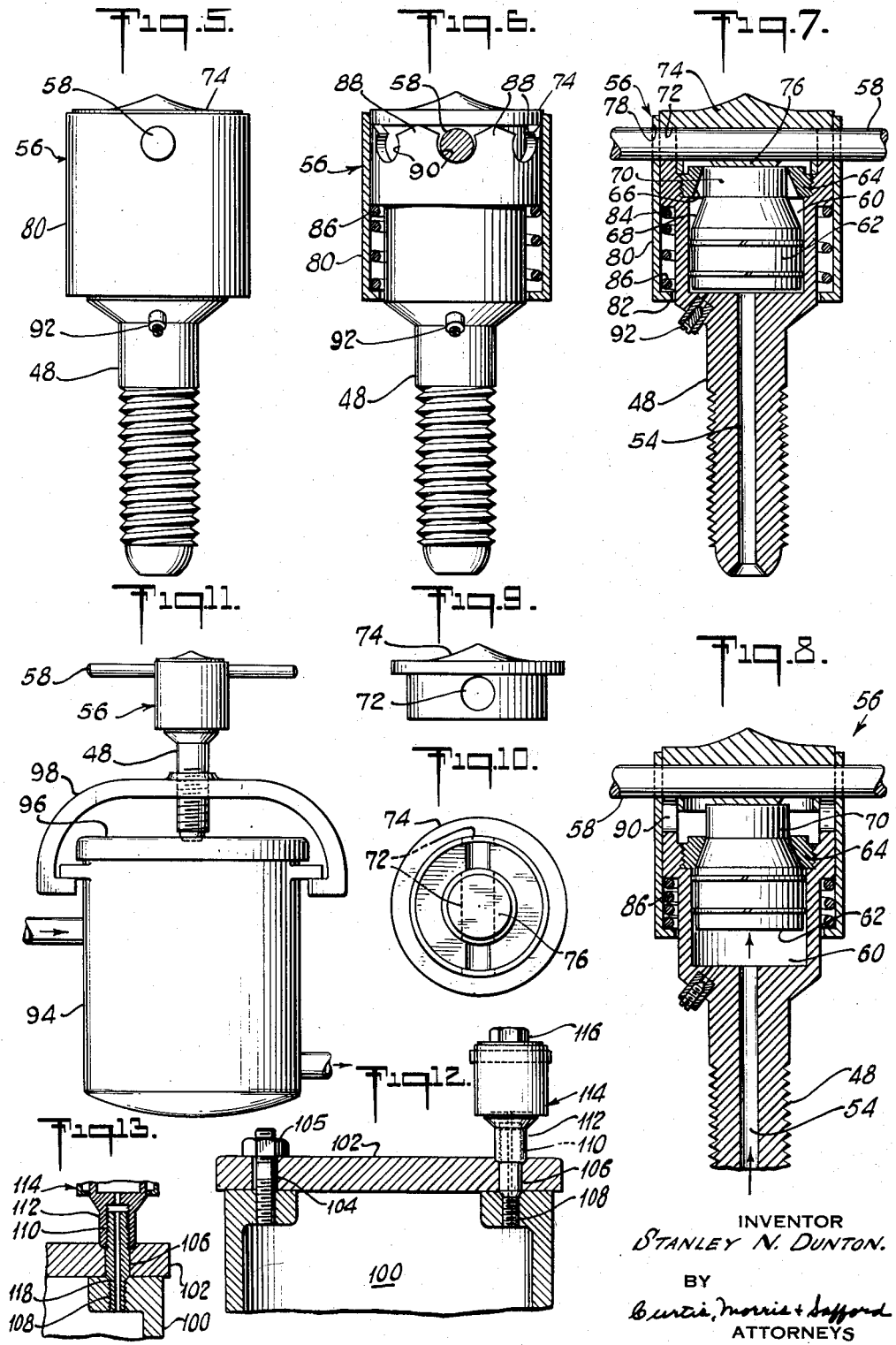

Feb. 23, 1954
S. N. DUNTON
2,670,099
SAFETY BOLT CONSTRUCTION
Filed March 30, 1950
4 Sheets-Sheet 3
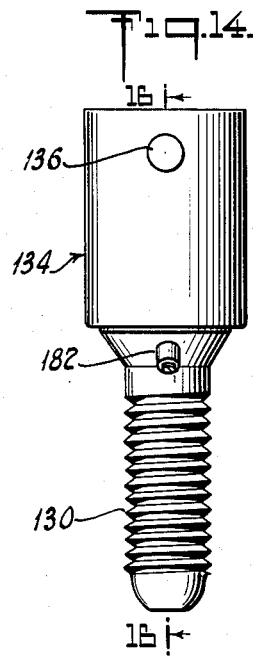
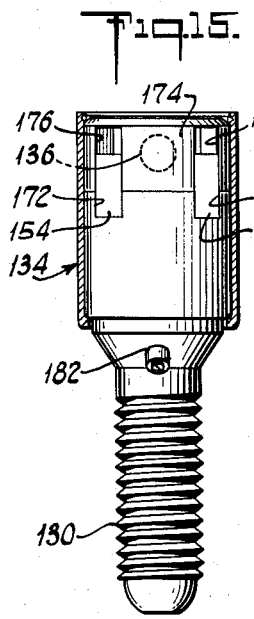
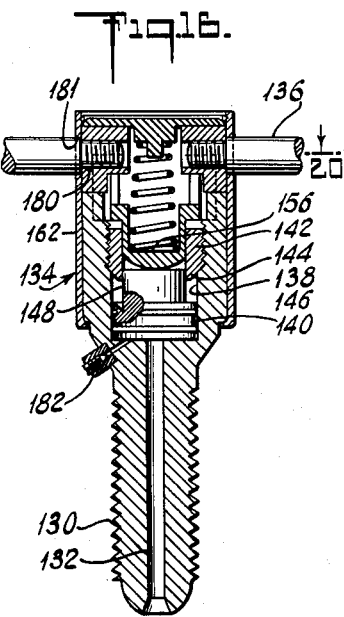
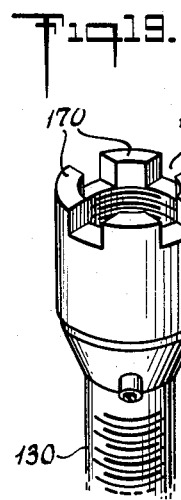
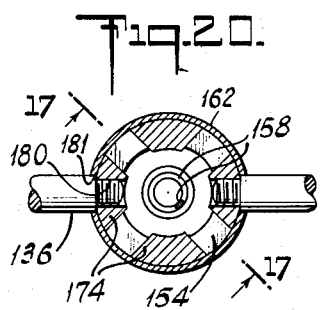
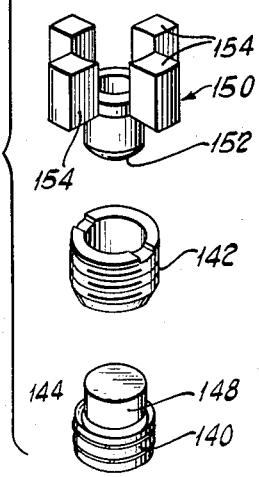
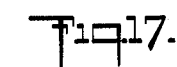
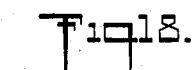
INVENTOR
STANLEY N. DUNTON.
BY
Curtis, Morris & Safford
ATTORNEYS Feb. 23, 1954 S. N. DUNTON 2,670,099
SAFETY BOLT CONSTRUCTION
Filed March 30, 1950 4 Sheets-Sheet 4
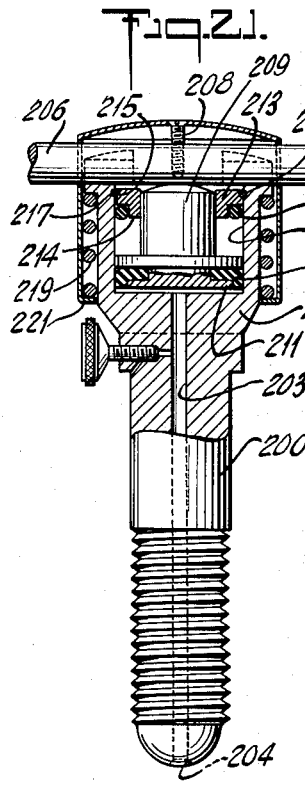
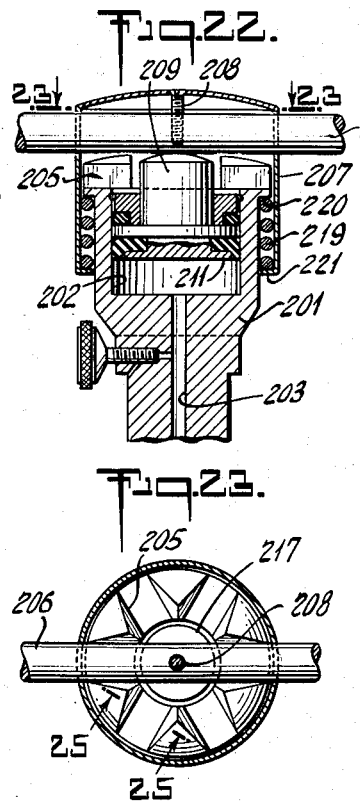
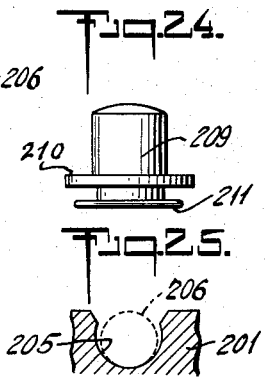
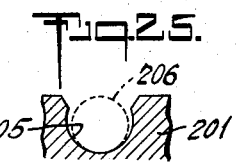
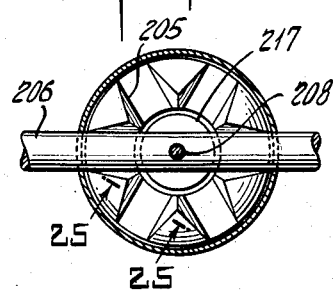
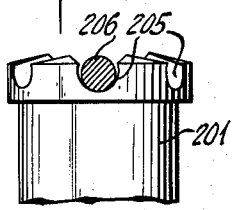
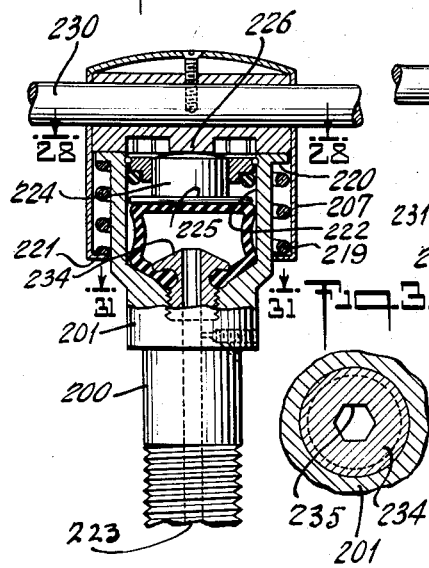
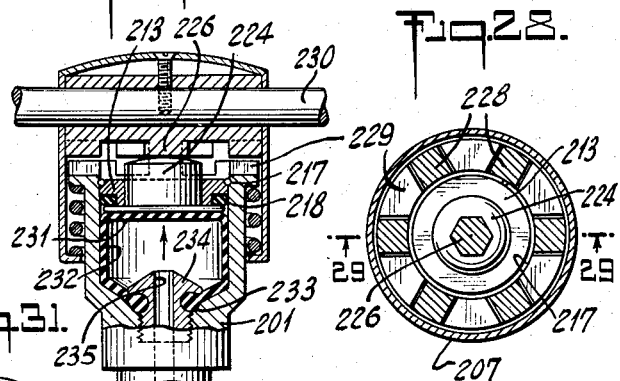
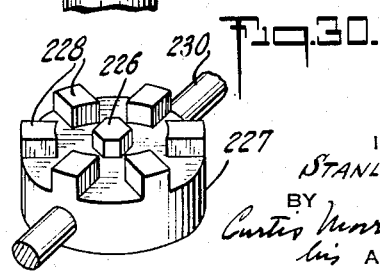
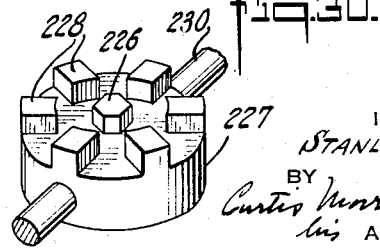
INVENTOR
STANLEY N. DUNTON.
BY
Curtis Morris & Safford
his ATTORNEYS Patented Feb. 23, 1954

2,670,099

UNITED STATES PATENT OFFICE 2,670,099

SAFETY BOLT CONSTRUCTION

Stanley N. Dunton, City Island, N. Y., assignor to Thomas C. Wilson, Inc., Long Island City, N. Y., a corporation of New York Application March 30, 1950, Serial No. 152,970

21 Claims. (Cl. 220—55.3)

This invention relates to a safety bolt construction. More particularly it pertains to a construction whereby cooperating parts, including a pressure vessel or system, are retained in assembled relationship until such time as the fluid pressure therein has been reduced to a level at which the parts may be disassembled without danger from escaping fluid.

This application is a continuation-in-part of my copending application Serial No. 63,334 filed December 3, 1948, now abandoned, for safety bolt construction.

The invention will be described in several embodiments including some having to do more particularly with an oil supply to a furnace such as is commonly employed with marine boilers, where a plurality of oil nozzles inject fuel simultaneously into the combustion chamber and where the nozzles must be removed at regular intervals or in emergencies and cleaned, repaired or adjusted without shutting down the boilers. Other applications and adaptations of the invention to different uses will, of course, occur to those skilled in the art.

It is a matter of common knowledge that many fires have been caused at sea because of the untimely removal of a holding bolt preparatory to removal and cleaning of a fuel nozzle when the latter was still in service and supplying oil under pressure to the combustion chamber. This problem has already been studied by marine engineers, and United States Patent No. 2,276,424 represents one form of safety mechanism heretofore proposed in an effort to preclude inadvertent removal of a nozzle holding bolt from a working nozzle.

It is an object of my invention to provide a safety bolt construction of the character described having to a notable extent the characteristics and capabilities set forth. A further objective resides in the provision of a safety bolt construction which is feasible for economical production on a commercial scale and which is foolproof in operation. A further objective is to provide a bolt which overcomes certain of the disadvantages inherent in prior constructions. Other objects will in part be pointed out as the description proceeds and will in part become apparent therefrom.

The invention resides in a structure wherein a bolt or the like is combined with a rotatable turning device, a cylinder having an opening through the bolt to a source of fluid pressure, a piston in said cylinder, and clutch mechanism interposed between said piston and said turning device, said parts being arranged and adapted, when pressure operates on the piston through said opening to move and hold said turning device out of turning relation to the bolt, and when said pressure is abated to release said turning device into turning relation to the bolt.

In this specification and the accompanying drawings I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in various forms, each as may be best suited to the conditions of a particular use.

In the drawings:

Figure 1 is a fragmentary side elevation of an oil burner nozzle assembly including one form of a safety bolt construction embodying my invention;

Figure 2 is a view of the construction shown in Figure 1 taken from below and looking upwardly;

Figure 3 is a fragmentary view on an enlarged scale taken along the line 3—3 of Figure 1;

Figure 4 is a fragmentary view on an enlarged scale taken along the line 4—4 of Figure 2;

Figure 5 is a side elevation on approximately full scale of the safety bolt shown in Figure 1;

Figure 6 is a view similar to that of Figure 5 showing some of the parts broken away;

Figure 7 is a central longitudinal sectional view of the bolt shown in Figure 5 taken along the line 7—7 with the parts disposed in bolt turning relation;

Figure 8 is a fragmentary view similar to that of Figure 7 showing the parts in safety position so that the bolt cannot be turned;

Figure 9 is a view of the cap piece forming a part of the bolt of Figures 5 through 8;

Figure 10 is a bottom view of the piece shown in Figure 9;

Figure 11 is a side elevation showing the bolt of Figures 5 through 8 employed as a part of one type of oil strainer assembly;

Figure 12 is a fragmentary side elevation of a modified form of bolt embodying my invention and applied to another type of strainer assembly;

Figure 13 is a fragmentary sectional view of part of the bolt assembly of Figure 12;

Figure 14 is a side elevation of a bolt constituting a further modification of my invention and with the parts disposed in bolt turning relation;

Figure 15 is a view similar to that of Figure 14 with some of the parts broken away;

Figure 16 is a central longitudinal sectional view of the bolt shown in Figure 14 taken along the line 16—16;

Figure 17 is a view similar to that of Figure 16 but with the parts in safety position so that the bolt cannot be turned;

Figure 18 is an exploded perspective view of some of the parts which together go into the bolt construction of Figures 15 through 17;

Figure 19 is a fragmentary view in perspective of another part embodied in the bolt of Figures 15 through 17;

Figure 20 is a transverse sectional view taken along the line 20—20 of Figure 16;

Figure 21 is a central longitudinal sectional view of a modification wherein a portion of the turning handle operates in effect as a clutch member and a ring of flexible material is associated with the piston as a sealing member, the parts being shown in bolt turning relation;

Figure 22 is a fragmentary view similar to that of Figure 21 showing the parts in position so that the bolt cannot be turned;

Figure 23 is a transverse sectional view on the line 23—23 of Figure 22;

Figure 24 is a view in side elevation of the piston shown in Figures 21 and 22;

Figure 25 is a fragmentary view in section on the line 25—25 of Figure 23;

Figure 26 is a fragmentary view in side elevation of the outer end portion of the bolt assembled with the turning handle when the parts are in the position shown in Figure 21;

Figure 27 is a central longitudinal sectional view of a modification wherein the piston is actuated by movement of a diaphragm-like member shown with the associated parts in bolt turning relation;

Figure 28 is a transverse sectional view on the line 28—28 of Figure 27;

Figure 29 is a fragmentary central longitudinal sectional view of the structure shown in Figure 27 but with the parts in safety position so that the bolt cannot be turned;

Figure 30 is a view in perspective showing the movable clutch piece in inverted position; and Figure 31 is a fragmentary transverse longitudinal sectional view on the line 31—31 of Figure 27 illustrating more particularly the angularly contoured central opening in the stem of the screw-threaded diaphragm retainer.

In Figure 1 a conventional type of oil burner or injector is generally indicated at 20 and includes a nozzle 22, a body 24 and an inlet elbow 26. The nozzle when in working position as shown is carried upon a bracket 28 mounted in wall 30. Bracket 28 incorporates a supply fitting 32 (see also Figures 2, 3 and 4) to which oil is fed by a line 34. Fitting 32 is provided with a passageway 36; elbow 26 is provided with a passageway 38. These passageways are brought into direct communication by closely engaging a seat 40 on fitting 32 with a face 42 on elbow 26. The face is secured in engagement with the seat by a yoke 44 pivotally mounted on fitting 32 by a pivot pin 46. The yoke includes a threaded opening 47 in which the threaded shank or stem 48 of a fastening bolt is engaged with one end bearing upon an abutment or pad 50 integrally formed on elbow 26.

For the purposes of this invention, pad 50 is provided with a bore 52 communicating with passageway 38 and leading to a bore or fluid passageway 54 passing axially through shank 48 for a purpose to be described hereinafter.

Oil under pressure is supplied to burner 20 through line 34, passageway 36, and passageway 38 of elbow 26 to nozzle 22. In order to safely remove said nozzle from its working position with pressure on in line 34 the oil supply under pressure is first closed off by a valve, as 34', in line 34; and then, by backing stem 48 out of opening 47 in yoke 44, the yoke can be swung downwardly, as indicated in Figure 1 by dotted lines, and face 42 can be separated from seat 40 and the burner 20 removed from bracket 28. To restore the burner 20 to operation, face 42 is seated on seat 40, yoke 44 is swung to the horizontal position illustrated in Figure 1, and the end of shank 48 is brought to bear against pad 50. When shank 48 is tightened in opening 47, the elbow 26 is effectively coupled with supply fitting 32; and when said valve 34' in line 34 is opened oil flows through passageways 36 and 38 into the burner to nozzle 22.

Ordinarily in the case of oil burning furnaces, the fuel will be supplied through several nozzles simultaneously; and operation of the furnace continues substantially uninterruptedly even though one of the nozzles may be temporarily removed or replaced. The oil supplied through these nozzles is at a substantial pressure; for example it often exceeds 100 pounds per square inch; and to remove the conventional type of holding bolt which clamps the burner in its supply fitting would constitute a considerable fire hazard if the oil supply were not first shut down. It is a matter of common knowledge that occasionally an operator will, for one reason or another, back the conventional type of holding bolt from its opening in the yoke to release, or partially release, the burner without first closing the valve 34' in the oil line. To avoid this risk, I have devised my safety bolt so that the head thereof will be incapable of turning its stem so long as pressure remains within the oil passageway system. Thus even though an operator should unwittingly or inadvertently attempt to back the holding bolt from its yoke before shutting off the oil supply he would be unable to turn the stem in the yoke opening until such time as he had closed the oil valve or the pressure had otherwise been reduced. Somewhat analogous conditions may be found in industrial and other installations wherein steam or fluids under pressure are employed.

In the illustrative form shown in Figures 1 to 4, stem 48 is a part of a bolt assembly including a head casing 56 and a cross bar or turning handle 58, shown in greater detail in Figures 5 through 8. Stem 48 is provided at its head end (see Figure 7) with a terminal head 48' and a cylinder 60 in which is disposed a piston 62 conventionally equipped with piston rings 62'. Piston 62 is retained within the cylinder by a retainer ring 64 which also provides a valve seat 66 in cooperative relation to a complementary valve surface 68 on piston 62 so that, when the piston is at the head or outer end of its stroke, surface 68 thereof is stopped or seated on valve seat 66 so as to form an effective seal against passage of fluid pressure from the stem side of the piston. Fluid pressure is supplied to the stem side of the piston through bore 54. Note that herein I speak of the topmost or outermost portions of the bolt (as viewed in Figures 5 through 8) as being at the head end; the lowermost or inner portions I refer to as being at the stem end.

Piston 62 includes at its head end a tappet 70 which extends upwardly or outwardly through the opening in retainer ring 64. Cross bar 58 overlies the end of tappet 70 and extends through diametrically opposed bores 72 in a cap 74 (see also Figures 9 and 10) forming a part of the head assembly. Cap 74 provides in effect an interponent, as a pad 76, against which the upper end of tappet 70 bears. Cross bar 58 also extends through diametrically opposite openings 78 in said casing 56 which, with cap 74, forms in effect the exterior housing of the bolt head assembly. Said casing 56 includes an inturned flange 82 at its stem end. Said head portion 48' of stem 48 forms an annular shoulder 84, Figure 6. A compression spring 86 surrounds the cylinder portion of stem 48 and is restrained between flange 82 on casing 56 and shoulder 84 so as to urge casing 56 and cross bar 58 downwardly or inwardly, as shown in Figure 7, toward the stem end of the bolt.

The head end 48' of the bolt is provided around its periphery with a series of alternately disposed abutments 88 and spaces 90 giving the castellated appearance illustrated in Figure 6. In the relationship illustrated in Figure 7, a portion of cross bar 58 provides in effect a clutch piece which engages diametrically opposite spaces or notches 90 between abutments 88 and accordingly a turning force applied to cross bar 58 transfers the full torque through abutments 88 and the intermediate head portion 48' and cylinder 60 to stem 48 proper. However, when, for example as illustrated in Figures 1 through 4, the stem is so assembled with other apparatus that fluid pressure is supplied thereto through bore 54 to the inner or pressure surface of piston 62, the piston moves to lift cross bar 58 and casing 56 to compress spring 86, as shown in Figure 8, and in so doing lifts cross bar 58 from engagement with said notches or spaces 90 and clear of the topmost portions of abutments 88. In this relationship of the parts, a turning force applied to cross bar or handle 58 serves only to rotate said bar 58 and casing 56 now loosely engaging the interior members of the bolt assembly; and no torque is transferred to stem 48. Accordingly, so long as there is fluid pressure supplied through bore 54 to cylinder 60 the bar or clutch piece 58 is in disengaged position and it is impossible to unscrew the bolt from its assembled position by applying turning force to said bar. In the form shown in Figures 1 through 4, so long as fluid under sufficient pressure to compress spring 86 is being supplied thereto, the burner cannot be disassembled from its position shown merely by turning handle 58.

Sometimes a nozzle will become plugged while the parts of the bolt are in the relationship illustrated in Figure 8 with handle 58 disengaged from notches 90. If the valve in the oil line is then closed, the pressure of the trapped fluid will continue to exert a force against the piston so that the bolt cannot be unscrewed from the yoke by turning said handle. To offset this difficulty, I have equipped the bolt with a needle valve 92 having a passageway communicating with bore 54, whereby pressure within the bolt cylinder may be relieved with the loss of only a small amount of fluid. Compression spring 86 is thus enabled to return the piston to the position illustrated in Figure 7 and to seat cross bar 58 in the notches 90 between abutments 88 so that the bolt can be withdrawn by turning said handle or cross bar, thus freeing yoke 44 and permitting removal of the plugged part.

In manufacturing the bolt shown in Figures 5-10, I have found it advantageous to form the head portion by assembling the threaded retainer ring 64 with the terminal head 48' which, in the finished article, is integral with the cylinder 60 and the stem portion 48. For greater convenience in manufacture, the stem portion 48 may be formed initially as a separate piece. In such case, I insert the piston carrying the rings 62' into the cylinder 60 from its stem end. I then weld the outer end of the stem to the bottom end of the cylinder wall. In order to allow for the slight change of dimensions which attends the welding process, I make the cylinder with its inner surface tapering from its outer end toward a slightly smaller stem end opening, whereby in expanding during welding it assumes and retains the desired cylindrical shape when the welding is finished and the parts have cooled. To avoid undue heating of the parts during the welding I have found it advantageous to run water or some suitable cooling agent through the bore 54 and cylinder 60. This coolant is permitted to escape at the head end of the bolt through a suitable escape passageway (not shown) temporarily extending axially through piston 62 and tappet 70. After the welding is finished, this passageway may be conveniently sealed off by a threaded plug (not shown) inserted into the passageway in tappet 70 through the head end thereof.

In Figure 11 I have illustrated the bolt in assemblage with a duplex strainer such as is a common part of marine fuel oil supply systems. Strainer body 94 and lid 96 are held in sealed relationship by a yoke 98 through which the bolt is threaded and bears against a portion of lid 96 to lock the lid upon the body, it being understood that lid 96 is provided with a pressure transmitting bore 52' communicating with the interior of the body 94.

In Figures 12 and 13 I show another form of pressure vessel 100 and lid 102. An ordinary stud 104 and holding nut 105 appear on one side of the lid; and a stud 106 appears on the other side threaded into a stud hole 108 with a projecting threaded stud end 110. In this instance, an internally threaded bolt stem 112 is screwed down on end 110 to bear against lid 102; and the head assembly 114 of the bolt is similar to that described previously except that the cap incorporates a hexagonal head 116 so that a wrench can be applied to it. As shown in Figure 13, stud 106 includes a bore 118 by which fluid pressure may be directed from within vessel 100 to the cylinder and piston forming a part of head assembly 114.

Figures 14 through 20 illustrate a further modification of a safety bolt embodying my invention. In the case of the safety bolt constructions heretofore illustrated, when fluid pressure is holding the cross bar out of clutching engagement with notches 90, the clutching relationship could be reestablished and the safety function of the bolt impaired by applying a stemward force against the cross bar of sufficient magnitude to overcome the fluid pressure on the piston. Thus, in the relationship shown in Figure 8, cross bar 58 can be depressed against the pressure of oil inside the cylinder if sufficient force toward the stem end of the bolt is applied on the cross bar. The force thus required might be on the order of several hundred pounds in a marine installation for example; and under such circumstances the likelihood of cross bar 58 being pressed in to bolt turning position is extremely remote. For low pressure systems, however, and in instances where a positive locking out of the clutched relationship is deemed advisable, the embodiment of Figures 14 through 20 is indicated.

In the device shown in Figure 16, the bolt incorporates a stem 130 having a central axial bore 132 and a head assembly including a shell 162 and a cross bar or turning handle 136. A cylinder 138 is formed within the head end of the stem. A piston 140 occupies a part of the space within cylinder 138 and is there retained by a retainer ring 142. The ring presents a downwardly directed annular frusto conical shaped valve seat 144; and the piston includes a complementary annular inverted valve surface 146 so that outer end surface portions of the piston can seat as a valve against retainer ring 142 and thus stop any flow of fluid through bore 132 past the piston. I have found that in some instances a tapering seat and an inverted valve surface, as shown, seem to produce more effective sealing than a flat valve seat and flat valve surface on the piston.

The head side of piston 140 carries a tappet 148 passing upwardly through the opening in ring 142 into contact with a superimposed sliding element, as clutch 150, which (Figures 17 and 18) incorporates an interponent, as a pad 152, feathers 154 and a spring seat 156. Clutch member 150 is biased to hold against the uppermost part of tappet 148 by a spring 158 held in compression against seat 156 by an overlying disc 160 which is retained as the end closure for said shell 162 by a snap ring 164. Shell 162 is provided around its lower periphery with an inturned flange 166 bearing against a shoulder 168 on stem 130.

The stem 130 is provided (Figure 19) around its upper periphery with a series of abutments 170 and spaces 172 giving a castellated effect. Between cap 160 and the uppermost surfaces of abutments 170 there is disposed a turning piece 174 (Figure 18) provided with four splines 176 shaped to receive the four feathers of sliding clutch member 150. Piece 174 includes a central opening 178 through which compression spring 158 extends. Piece 174 also includes diametrically opposite outwardly facing threaded holes 180 (Figures 18 and 20) into each of which the inner end of one of said cross cars or handles 136 is screwed. Shell 162 is also provided with openings 181 in alignment with said threaded holes 180 and through which bars 136 pass when positioned as shown in Figure 16. As in the previously described embodiment, the bolt includes a needle valve 182 by means of which pressure trapped within bore 132 and cylinder 138 may be relieved.

With the parts in the relationship illustrated in Figure 16, i. e. with no fluid pressure in cylinder 138, a turning force applied to bars 136 creates a torque on turning piece 174. This torque is transferred to abutments 170 by means of the feathers 154 of clutch 150 which in part extend into the splines 176 in piece 174 and in part extend into the spaces 172 between abutments 170. In the absence of fluid pressure from cylinder 138, spring 158 biasing clutch member 150 toward the stem end of the bolt causes the feathers thereof to assume a seated position in spaces 172. When fluid pressure is admitted through bore 132 to cylinder 138, however, piston 140 is caused to move upwardly; and tappet 148, bearing against pad 152, causes clutch 150 to be moved upwardly compressing spring 158 against cap 160 and lifting feathers 154 upwardly into the splines 176 of turning piece 174 and wholly out of turning engagement with abutments 170, as shown in Figure 17. When feathers 154 are thus disposed, no clutching relationship exists between turning piece 174 and the castellated rim of the stem; and accordingly, a turning force applied to cross bars 136 has no effect upon stem 130. Cross bars 136, piece 174, and sliding element 150 then rotate freely with respect to the other parts of the head assembly.

It will be observed that the clutching relationship between turning piece 174 and the castellated rim on stem 130 can be restored only when pressure within cylinder 138 is such that spring 158 can force the clutch member 150 and piston 140 downwardly to extend feathers 154 into spaces 172. Sliding clutch element 150 is inaccessible within the interior of the head assembly; and no amount nor direction of force applied to cross bars 136 can be effective to cause the feathers to assume their clutching relationship; only an absence of pressure within bore 132 and cylinder 138 will permit the clutching relationship to be established.

The modifications illustrated in Figures 21 to 31 inclusive are more particularly adapted to operate under conditions encountered in supplying fuel oil under pressure and where the injectors or nozzles and associated parts are ordinarily subjected to higher than normal atmospheric temperatures. In addition, the devices illustrated in these figures present advantageously simple structural features which are easily made and economically assembled.

Referring to Figure 21, the device there shown comprises a body 200 including a shank and a head 201, the latter being provided with a cylindrical recess 202. A pressure transmitting passageway 203 extending through the shank is arranged with its inner end opening into said recess 202 and its outer end opening through the end of the shank at 204. The outer end of head 201 is provided with a series of radial slots 205 of a size and shape to receive portions of a turning handle 206 which extends through lateral openings in a casing 207, to which it is secured in operative position by a screw 208. A piston, Figure 24, mounted in recess 202, includes a tappet portion 209, a peripheral flange 210 and an end flange 211. A sealing member in the form of a cup ring 212 preferably made of buna neoprene rubber is held between end flange 211 and peripheral flange 210 of the piston.

The piston and sealing means assembly is retained in recess 202 by a stop or detent in the form of a ring 213 having a central opening, which embraces and guides tappet 209, and an inwardly extending annular stop flange 214. Ring 213 is provided with an outwardly exposed peripheral groove 215; and head 201 with an inwardly exposed annular groove 216. When the parts are assembled in the relative positions shown in Figure 21, for example, the stop 213 is held in operative relation with the head member 201 by means of a snap ring 217; and the piston is held by said ring 213 in effective operative relation to the recess 202 and connected parts. A supplementary sealing member in the form of a buna neoprene ring 218 is positioned between the stop flange 214 and the adjacent interior wall surfaces of recess 202. The dimensions of said sealing ring, which is resilient and compressible, are such that a portion of said ring normally extends inwardly beyond the innermost annular surface of stop flange 214, as indicated in Figure 21. However, when the piston is pushed to its outermost position, Figure 22, by pressure in passageway 203, said sealing ring 218 is compressed between flange 210 of said piston and the peripheral flange of stop ring 213 sufficiently to more effectively seal the joint between said stop ring 213 and adjacent interior wall surfaces of the recess 202.

A spring 219 having one end bearing against shoulder 220 of head 201 and the other against flange 221 of casing 207, normally, i. e. without pressure in passageway 203, inwardly biases the turning handle 206, which, in this embodiment also serves as a clutch piece movable toward and into engagement with the radial slots 205, so that the body member or bolt 200 may be readily turned thereby in either direction.

However, when fluid under pressure is operating in the passageway 203 with sufficient force, the tappet 209 of the piston provides an interponent which presses against and moves handle 206 outwardly until piston flange 210 comes into engagement with stop 214. In this position, Figure 22, said tappet 209 bears against and holds the turning handle 206 beyond the outer end of head 201 and out of engagement with the radial slots 205. If said handle 206 is now turned, the casing 207 will turn freely without turning the body or bolt 200.

It has been found that a satisfactory material for use in making the cup ring 212 and the supplementary sealing ring 218, where the safety device is employed to secure fuel oil nozzles in operative position to deliver fuel oil to boilers or the like, is buna-neoprene rubber preferably of a quality producing a durometer reading of approximately 50. For such conditions of use a valuable characteristic of this material, as compared to some others which are not so satisfactory, is that it remains unimpaired by extended exposure to fuel oil at temperatures up to 350° F.

Referring now to the further modification illustrated in Figures 27 to 31 inclusive, the body member 200 is provided with a recess 222 and a pressure transmitting passageway 223 communicating therewith. A piston 224 having a peripheral flange 225 is mounted in recess 222 with its outer end portion positioned to engage an interponent in the form of an inwardly projecting member 226 forming part of a clutch piece 227, Figure 30, having teeth 228 arranged to engage teeth 229 formed in the outer rim of said body member 200. A turning handle 230 extends through said clutch member 227 and through opposed lateral openings in the outer casing 207. Spring 219, interposed between shoulder 220 and flange 221, normally biases said clutch piece 227 inwardly to engage its teeth 228 between teeth 229, this being the turning position of said clutch piece whereby the body member 200, such as a bolt or the like, may readily be turned in either direction by turning handle 230.

Piston 224 is moved outwardly to dislodge clutch piece 227 from its operative or turning position by a diaphragm 231 forming part of a flexible expansible sack-like member 232 having an opening defined by a ring or bead 233. Said sack is held in position in recess 222 by means of a threaded clamp 234 having a passageway 235 of angular cross-sectional contour, here shown hexagonal in shape. The threaded portion or stem of clamp 234 engages with a similarly threaded opening in body member 200, said opening being coaxial with the passageway 223. The sack-like member 232 is preferably made of buna-neoprene rubber as above described in connection with the sealing members 212 and 218.

To assemble sack 232 in position as shown in Figures 27 and 29, the head of clamp 234 is inserted through the opening defined by the annular bead 233. The threaded stem of said clamp is engaged with the correspondingly threaded opening in member 200 and is screwed down to clamping position by means of a suitable tool, such as one having a stem of hexagonal cross section (not shown) which is extended inwardly through the passageway 223 and into turning engagement with the hexagonally-shaped opening 235 of clamp 234 and is manually actuated by a crank, or the like, secured to the stem.

When said sack 232 is snugly fitted in recess 222, as shown, the interior of said sack is in free communication with the passageway 223 so that, when pressure is applied through said passageway, expansion of said sack causes the diaphragm 231 to be moved outwardly against piston 224 which in turn presses against the extension 226 of clutch piece 227 thus disengaging teeth 228 thereof from the teeth 229. While pressure is maintained in passageway 223, said clutch is held disengaged as described; and the body or bolt 200 cannot be turned by turning handle 230 which merely rotates freely in relation thereto.

The extent of outward movement of piston 224 is limited by stop ring 213 which with the supplemental sealing ring 218 is held at an outer end portion of recess 222 by means of snap ring 217, in a manner similar to that described in connection with the foregoing description of the embodiment shown in Figures 21 and 22.

It is to be noted that the type of clutch mechanism shown in Figures 27 and 29, for example, may be successfully and satisfactorily employed in safety devices embodying other forms of piston and sealing constructions including those shown in Figures 21 and 22, for example.

From the foregoing it will be seen that a safety bolt made in accordance with the present invention is well adapted to attain the ends and objects hereinbefore set forth and to be economically manufactured since both the article and the methods of making it are suited to common production methods and are susceptible to a wide latitude of variations, as may be desirable in adapting the invention to different applications.

As various embodiments may be made of the above invention and as changes might be made in the embodiments above set forth, it is to be understood that all matter hereinbefore set forth or shown in the accompanying drawings is to be interpreted as illustrative and not in a limiting sense.

I claim:

1. Safety attaching device comprising in combination a head provided with a recess having an opening at one end and a threaded shank having a longitudinal bore extending therethrough from the other end of said recess, a clutch piece mounted on said head coaxially with said shank and movable axially on said head in one direction out of clutching engagement therewith, a spring operatively interposed between said head and said clutch piece and biasing said clutch piece in the opposite direction and toward clutching engagement with said head, a piston coaxial with said shank and mounted to reciprocate axially in said recess between said clutch piece and said bore, and an interponent cooperating with said piston and movable axially through said end opening of the recess to disengage said clutch piece from said head against resistance of said spring when fluid under pressure is admitted through said bore.

2. Safety attaching device comprising in combination a head provided with a recess having an opening at one end and a threaded shank having a longitudinal bore extending therethrough from the other end of said recess, a piston mounted in said recess and movable outwardly toward and inwardly from the open end of said recess, said piston sealing the recess, stop means in said head limiting the outward movement of the piston in the recess, a clutch piece mounted on said head coaxially with said shank and movable axially on said head in one direction into clutching engagement therewith and in the opposite direction out of clutching engagement therewith, a spring operatively interposed between said head and said clutch piece and biasing said clutch piece toward turning engagement with said head, and an interponent operatively disposed between said clutch piece and said piston and movable by said piston outwardly through said open end of the recess to disengage said clutch piece from said head against resistance of said spring when fluid under pressure is admitted through said bore into said recess and move said piston outwardly.

3. Safety attaching device comprising in combination a head provided with a recess having an opening at one end and a threaded shank having a longitudinal bore extending therethrough from the other end of said recess, a clutch piece rotatably mounted on said head coaxially with said shank and biased inwardly toward clutching engagement therewith, an expansible sealing member mounted in said recess and having a portion movable axially in the recess and having a wall between said clutch piece and said bore and movable axially within the recess, and an element mounted in said recess and movable outwardly to disengage said clutch piece from said head, said element being moved outwardly by the end wall of said member when the latter is separated by fluid under pressure admitted to said recess through said bore.

4. Safety attaching device comprising in combination a head provided with a recess having an opening at one end and a threaded shank having a pressure transmitting passageway extending therethrough from the other end of said recess, a clutch piece rotatably mounted on said head coaxially with said shank and biased inwardly toward clutching engagement with said head, a hollow expansible sealing member mounted in said recess between said clutch piece and said passageway and having an opening disposed toward the recess end of said passageway, and a hollow clamping element mounted in the end of the passage adjacent the recess and having a portion extending into the recess, said element holding the sealing member in place with the opening in said member in communication through the clamping element with said passageway, said sealing element having an end wall movable outwardly toward said clutch piece to disengage said clutch piece from said head, said end wall being moved outwardly by fluid under pressure admitted to the interior of said sealing element through said passageway.

5. A safety device of the character described including a threaded stem and a hollow cylinder, said stem having an axial bore communicating with the cylinder, a piston slidably mounted within said cylinder and movable toward an outer position by fluid pressure admitted thereto introduced through said bore, said cylinder and said piston having complementary surfaces forming a valve and valve seat cooperating therewith whereby passage of fluid past said piston and out of said cylinder is prevented, a stem turning mechanism mounted on and coaxially with said cylinder and positioned to be engaged by a portion of said piston, a castellated rim mounted coaxially on said cylinder, said stem turning mechanism having abutment portions interengaging with castellations of said rim when the piston is at the inner end of its stroke and said abutment portion being held clear of said castellations when the piston is at the outer end of its stroke, and a spring interposed between said stem turning mechanism and said stem and normally biasing said abutment portions toward inter-engagement with said castellated rim.

6. In a fluid pressure system, the combination of a conduit member attachable to and removable from a portion thereof, said conduit member having a pressure transmitting passageway opening through a wall portion thereof, and a fastening bolt having a head and a threaded shank provided with a longitudinally extending pressure transmitting passageway, a bracket to receive said shank and having a screw-threaded bolt hole to retain the bolt in position to hold said conduit member in operative attached relation to said system and with one end of said shank passageway in communication with said conduit passageway, a bolt turning clutch mounted coaxially with said shank and biased toward shank turning engagement with a portion of the bolt and movable axially thereof to a position out of shank turning engagement therewith, said clutch being freely rotatable in relation to said head when in said disengaged position, a piston operatively positioned between said shank passageway and said clutch and movable outwardly toward said clutch by operation of pressure transmitted through said shank to move said clutch to disengaged freely rotatable position.

7. A safety device of the character described comprising a threaded bolt having a cylindrical recess and a pressure transmitting passageway extending therethrough with its inner end opening into said recess, a clutch coaxially mounted in relation to said bolt and normally spring biased toward engagement therewith, a piston stop member mounted at one end of said recess, a piston mounted in said recess between said stop and the inner end opening of said passageway and movable axially to move said clutch out of engagement with said bolt, and sealing means cooperating with interior surfaces of said recess and operatively disposed between said inner end opening of the passageway and said stop member and movable with axial movement of the piston in said recess.

8. Device according to claim 7 and wherein the piston stop member is provided with an outwardly exposed peripheral groove, the bolt is provided with an inwardly exposed annular groove, and a snap ring engages said grooves to hold said stop member in operative assembled relation to said bolt.

9. Device according to claim 7 and wherein the stop member is provided with a stop flange, and a sealing ring of flexible compressible material is interposed between said flange and adjacent surfaces of the cylindrical recess.

10. Device according to claim 7 and wherein the piston carries sealing means in the form of a cup ring of resilient flexible material having peripheral portions closely engaging interior surfaces of the cylindrical recess.

11. Device according to claim 7 and wherein the piston carries a sealing cup ring disposed with its periphery engaging inner surfaces of said recess and a supplementary sealing ring interposed between a portion of the stop member and inner surfaces of said recess is positioned to be compressibly engaged by a portion of said piston.

12. A safety bolt of the character described and adapted to be secured in a threaded opening through the wall of a pressure-confining structure, said bolt comprising a threaded stem provided with a longitudinal bore extending axially therethrough and a head, stem turning means rotatably mounted on said head and coaxial with said stem and releasably clutchable to said head for turning the head in said threaded opening; said stem being provided with a cylinder arranged coaxially therewith and communicating with the inner end of said bore, and said head having torque transmitting portions adapted to receive stem turning forces from said stem turning means, a pressure-responsive piston interposed in said cylinder and across the cylinder end opening of the bore in said stem and coaxial with said stem, and movable axially of said cylinder between extended and retracted end positions therein, a tappet arranged between the piston and said stem turning means, said stem turning means including an interponent having abutment portions and being engageable by said tappet and movable in one direction longitudinally in relation to said stem to disengage said abutment portions from said torque transmitting portions when said tappet is moved outwardly to extended position by said piston, and said interponent being spring biased to bring said abutment portions to engage said torque transmitting portions when said piston is in retracted position.

13. The invention of claim 12 wherein a compressible spring operatively interposed between said stem and said stem turning means normally biases said abutment portions toward meshing relationship with said torque portions.

14. A safety bolt of the character described including a threaded stem having a head portion at one end in the form of a hollow cylinder coaxial with said stem and a bore extending axially through said stem and communicating with the interior of the cylinder, a piston slidably mounted for axial movement in said cylinder and movable outwardly toward extended position by fluid pressure admitted into said cylinder through said bore, a piston retaining ring fixed in one end of said cylinder, complementary surfaces on said ring and said piston arranged and adapted to form a valve and valve seat whereby passage of fluid past the outer end of said piston and out of said cylinder is prevented, a tappet extending from said outer end of the piston, stem turning means coaxial with said stem and having a contact area positioned to be engaged by said tappet, a castellated rim on the head of said bolt, said stem turning means having abutment portions arranged and adapted to bear against the castellations of said rim when the piston is at one end of its stroke and to be out of turning engagement with said castellations when the piston is at the other end of its stroke, and a spring interposed between said stem turning means and said stem and normally biasing said contact area against said tappet and said abutment portions into engagement with said castellations.

15. A safety bolt of the character described including a threaded stem having a hollow head portion which forms a cylinder coaxial with the stem and a bore extending axially through said stem and communicating with the interior of the cylinder, a piston slidably mounted in said cylinder and movable outwardly toward extended position by fluid pressure admitted into said cylinder through said bore, a retaining ring fixed in the outer end of said cylinder, complementary surfaces on said ring and said piston arranged and adapted to form a valve and valve seat, whereby passage of fluid past the outer end of said piston and out of said cylinder is prevented, an exteriorly accessible splined stem turning piece mounted coaxially with the stem, a tappet arranged at the outer end of said piston, a clutch piece having a contact area and being positioned between said tappet and said stem turning piece, a spring yieldably urging said clutch piece against said tappet and castellations on the head portion of said stem arranged to be engaged by portions of said clutch piece while other portions remain in splined relation to said stem turning piece, whereby to transmit stem turning forces to the stem as and when they are applied to the turning piece.

16. A safety device of the character described including a head having a cylindrical recess and a threaded stem having a bore coaxial with and connected into said cylindrical recess, said head having a wall about said recess and provided with castellations arranged coaxially with said stem, a splined torque transmitting piece mounted in said head coaxially with said stem and accessible exteriorly thereof for turning said stem, a piston slidably mounted for limited axial movement between outer and retracted positions within said cylinder and movable toward outer position by fluid pressure admitted through said bore, a feathered element mounted in said head coaxially with said piston and having portions interengaging with said torque transmitting piece and being movable axially to move other portions out of engagement with the outward castellations with said movement of the piston, a spring mounted in said head between said torque transmitting piece and said feathered element and biasing the latter toward engagement with said castellations, portions of said feathers being releasably engaged with said castellations when the piston is in retracted position while other portions remain splined in said torque transmitting piece to transmit to said head and said shank turning forces applied to said torque transmitting piece.

17. A safety bolt comprising a threaded stem and a head coaxial therewith, said stem having a bore extending longitudinally therethrough and said head having radial slots in its outermost end arranged transversely in relation to the longitudinal axis of the stem, a stem turning element mounted on said head coaxial with said stem and having portions engageable with said head slots, a spring biasing said element toward slot-engaging position, said element being movable axially against yielding resistance of said spring out of slot engaging position, said head having a cylinder coaxial with said stem and communicating with the bore thereof, a piston movable axially in said cylinder toward and from said stem turning element, and a tappet having a portion slidably mounted in said cylinder between said element and the piston and movable by said piston to lift and hold said stem turning element out of slot engaging position against resistance of said spring.

18. The invention of claim 17 wherein said stem turning element includes an exteriorly accessible force-receiving member.

19. The invention of claim 17 wherein said stem turning element includes a portion inaccessibly disposed within the bolt and wherein the bolt includes an exteriorly accessible socket member in which the stem turning element remains splined as it moves into and out of clutching relationship with respect to said slotted head.

20. A safety device of the character described comprising a threaded shank provided with a passageway extending longitudinally therethrough and a head provided with torque transmitting portions arranged coaxially with said shank, shank-turning means mounted on said head coaxially with said shank and including a clutch movable longitudinally in relation to the shank between spaced positions, said clutch being engaged with said torque transmitting portions of the head for turning the shank about its longitudinal axis when in one of said positions and being disengaged from said head and freely rotatable when in the other of said positions, a pressure-responsive piston in said head coaxial with said shank and arranged opposite the inner open end of said passageway in said shank and movable axially from and to retracted position in relation thereto, a tappet in said head intermediate the piston and said clutch, said shank-turning means also including an interponent engageable by said clutch and said tappet and movable outwardly when said tappet is moved outwardly by said piston, and said interponent having abutment portions in mesh with said torque transmitting portions of the head when the piston is in retracted position.

21. The invention of claim 20 wherein the turning means includes a compressible spring normally retaining said torque and abutment portions in meshing relationship, one end of said spring bearing against a portion of said shank turning means and the other end bearing against said interponent.

STANLEY N. DUNTON.

References Cited in the file of this patent

UNITED STATES PATENTS

| Number | Name | Date |
|---|---|---|
| 1,858,013 | Heins | May 10, 1932 |

FOREIGN PATENTS

| Number | Country | Date |
|---|---|---|
| 524,941 | Great Britain | Aug. 19, 1940 |